US009413397B2

(12) United States Patent
Timmins et al.

(10) Patent No.: US 9,413,397 B2
(45) Date of Patent: Aug. 9, 2016

(54) ANTENNA AND AMPLIFIER STATUS MONITORING SYSTEM

(71) Applicants: Ian J. Timmins, Asheville, NC (US); John M. Ray, Asheville, NC (US); Curtis A. Wright, Fairview, NC (US)

(72) Inventors: Ian J. Timmins, Asheville, NC (US); John M. Ray, Asheville, NC (US); Curtis A. Wright, Fairview, NC (US)

(73) Assignee: OPTICAL CABLE CORPORATION, Roanoke, VA (US)

( * ) Notice: Subject to any disclaimer, the term of this patent is extended or adjusted under 35 U.S.C. 154(b) by 164 days.

(21) Appl. No.: 14/216,814

(22) Filed: Mar. 17, 2014

(65) Prior Publication Data

US 2014/0273896 A1    Sep. 18, 2014

Related U.S. Application Data

(60) Provisional application No. 61/791,974, filed on Mar. 15, 2013, provisional application No. 61/789,120, filed on Mar. 15, 2013.

(51) Int. Cl.
*H04B 1/04* (2006.01)
*H04W 88/08* (2009.01)

(52) U.S. Cl.
CPC ............ *H04B 1/04* (2013.01); *H04W 88/085* (2013.01)

(58) Field of Classification Search
CPC ....... H04B 7/2606; H04B 1/04; H04W 16/26; H04W 16/32; H04W 88/085
USPC ...................................................... 455/127.2
See application file for complete search history.

(56) References Cited

U.S. PATENT DOCUMENTS

| 2006/0105705 | A1* | 5/2006 | Maca | H04B 7/155 455/11.1 |
| 2009/0316609 | A1* | 12/2009 | Singh | H04B 7/2609 370/280 |
| 2011/0070824 | A1* | 3/2011 | Braithwaite | H04B 7/2606 455/25 |
| 2012/0159279 | A1* | 6/2012 | Braithwaite | H04W 84/047 714/751 |

* cited by examiner

*Primary Examiner* — Ajibola Akinyemi
(74) *Attorney, Agent, or Firm* — William G. Heedy; David M. Carter; The Van Winkle Law Firm

(57) ABSTRACT

A signal conditioning system for a distributed antenna network includes a donor antenna in a first location receiving a downlink radio frequency signal from a radio frequency source. A service antenna is in a second location different from the first location, wherein the service antenna transmits the downlink radio frequency signal to an end user device, and the end user device transmits an uplink radio frequency signal back to the service antenna. Separate gain control amplifiers process the uplink and downlink signals and are located at the separate first and second locations to reduce thermal noise in the uplink and downlink signals. Reduced thermal noise allows quality transmission over optical fibers in addition to coaxial cables. First and second microcontrollers at the first and second locations control respective attenuators and transmit power level data to remote computer processors.

11 Claims, 2 Drawing Sheets

ANTENNA AND AMPLIFIER STATUS MONITORING SYSTEM

CROSS REFERENCE TO RELATED APPLICATIONS

This non-provisional patent application claims priority to and incorporates entirely by reference two United States Provisional Patent Applications, namely U.S. Ser. No. 61/791,974 filed on Mar. 15, 2013, and entitled "Bi-Directional Signal Conditioning and Conversion System" as well as U.S. Ser. No. 61/789,120 filed on Mar. 15, 2013, and entitled Bi-Directional Amplifier Status Monitoring System.

TECHNICAL FIELD

This disclosure relates to the field of amplifiers processing data signals communicated between at least one donor antenna and at least one service antenna in an in-building wireless system that encompasses both optical fiber and coaxial cable installations for data transmission.

BACKGROUND

Numerous devices use wireless data transmission to process data signals from wireless service providers. For purposes of this disclosure, data signals include all types of wireless signals transmitted within a radio frequency (RF) communications system whether transmitting voice, images, video, or any kind of information. In one typical embodiment, the service provider transmits data signals from a plurality of base station towers in a network to a donor antenna located proximate (usually outside) a particular building or set of buildings utilizing in-building wireless transmission systems. The in-building systems include service antennas located inside a respective user's building (or at least closer to prospective end users if outside a building) to re-transmit a wireless signal to a user's wireless device with a stronger and more reliable signal. In order to maximize signal quality to and from antennas in a network, it is common for distributed antenna systems to incorporate a bi-directional amplifier between the donor and service antennas. In one embodiment, the bi-directional amplifier may utilize RF filters (i.e., multiplexor) to separate wireless communications channels into smaller segments, such as transmit and receive channels. The bi-directional amplifier, therefore, may be placed in line between the donor antenna and the service antenna to process and amplify the respective RF signal to be re-transmitted by the antennas. The use of bi-directional amplifiers for the purpose of enhancing in-building wireless communications is becoming a more widespread practice to support mobile voice and data services.

A need exists in the art of signal transmission to address certain signal attenuation factors in the transmission lines that are used for uploading and downloading signals from the bi-directional amplifier. Attenuations factors to be addressed herein include signal degradation inherent in cables extending long distances, thermal noise, and proper control of the power levels in adjacent transmission channels.

BRIEF SUMMARY OF THE INVENTION

In one embodiment, a signal conditioning system for a distributed antenna network includes a donor antenna in a first location receiving a downlink radio frequency signal from a radio frequency source and a service antenna in a second location different from the first location. A first amplifier is positioned proximately to the service antenna in the second location, and the first amplifier receives the downlink radio frequency signal from the donor antenna, amplifies a power level of the downlink signal transmitted from the donor antenna, and transmits an amplified downlink radio frequency signal to the service antenna. The service antenna transmits the amplified downlink radio frequency signal to an end user device, and the end user device transmits an uplink radio frequency signal back to the service antenna. A second amplifier is positioned proximately to the donor antenna in the first location apart from said first amplifier in said the second location. The second amplifier receives the uplink radio frequency signal from the service antenna.

In another embodiment, a signal conditioning system for a distributed antenna network includes a donor antenna in a first location receiving a downlink radio frequency signal from a radio frequency source. A service antenna is in a second location different from the first location, wherein the service antenna transmits the downlink radio frequency signal to an end user device, and the end user device transmits an uplink radio frequency signal back to the service antenna. The donor antenna receives the uplink radio frequency signal from the service antenna. A first radio frequency power sensor in communication with the downlink radio frequency signal confirms a downlink signal power level of the downlink radio frequency signal. A first controller is in electronic communication with the first radio frequency power sensor, and a second radio frequency power sensor is in communication with an uplink radio frequency signal confirming an uplink signal power level of the uplink radio frequency signal. A second controller is in electronic communication with the second radio frequency power sensor. The first and second controllers transmit power level data to a remote computer processing the power level data.

DETAILED DESCRIPTION

Figure 1:
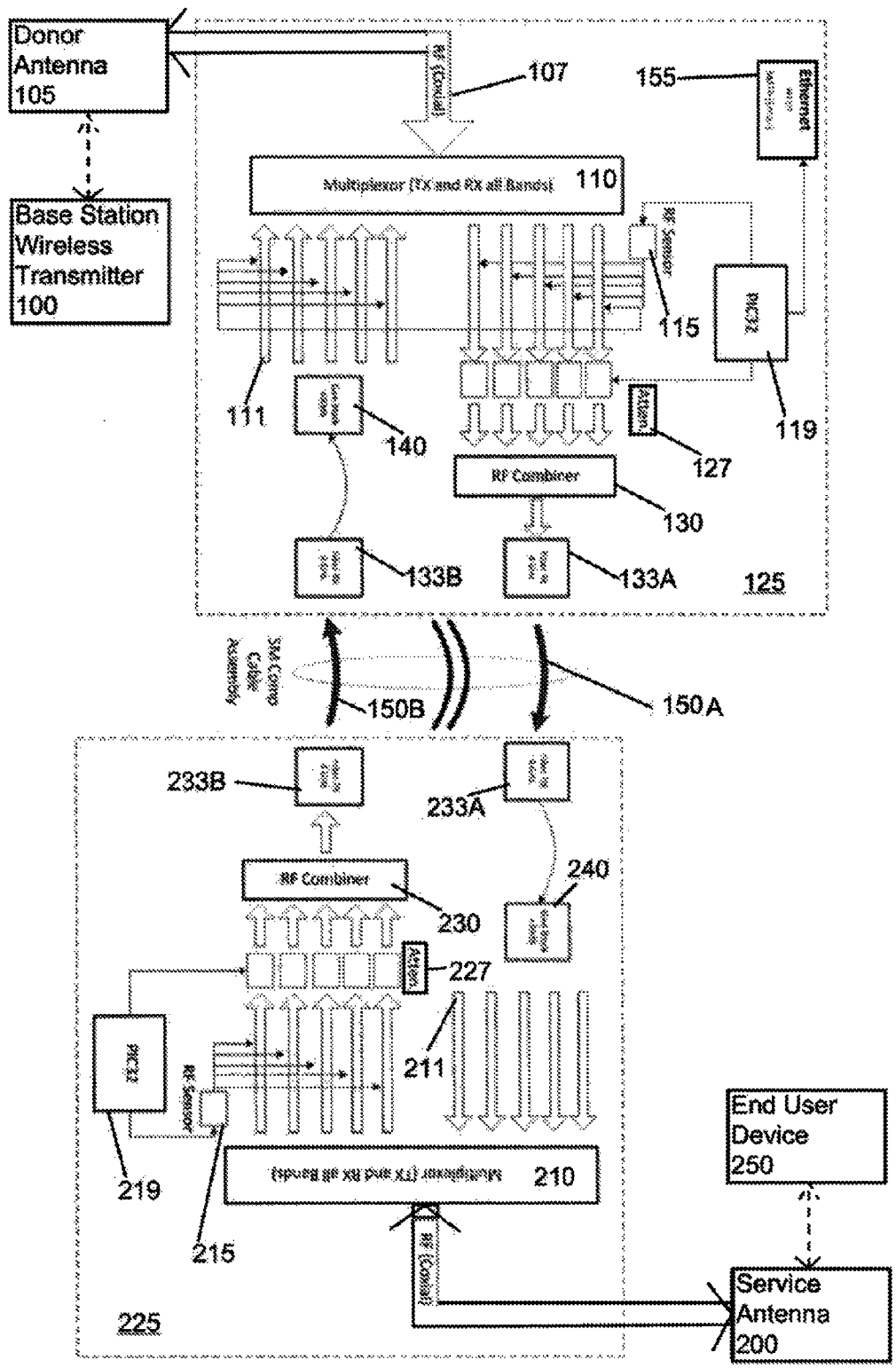
FIG. 1 is a schematic diagram of one embodiment of a distributed antenna network as described herein.

FIG. 1 is an overview of a distributed antenna system that incorporates processing capabilities for managing communications between base station transmitters, donor antennas, and service antennas transmitting signals to end user devices (e.g., mobile phones and portable computers). FIG. 1 characterizes three overall system features:

(i) Bi-directional signals transmitted across coaxial wire cables in conjunction with optical fibers;
(ii) Separated amplifiers for uplink and downlink signal processing;
(iii) Micro-controller managed radio frequency sensor and attenuators communicating with remote processors for controlling the power levels remotely.

Figure 2:
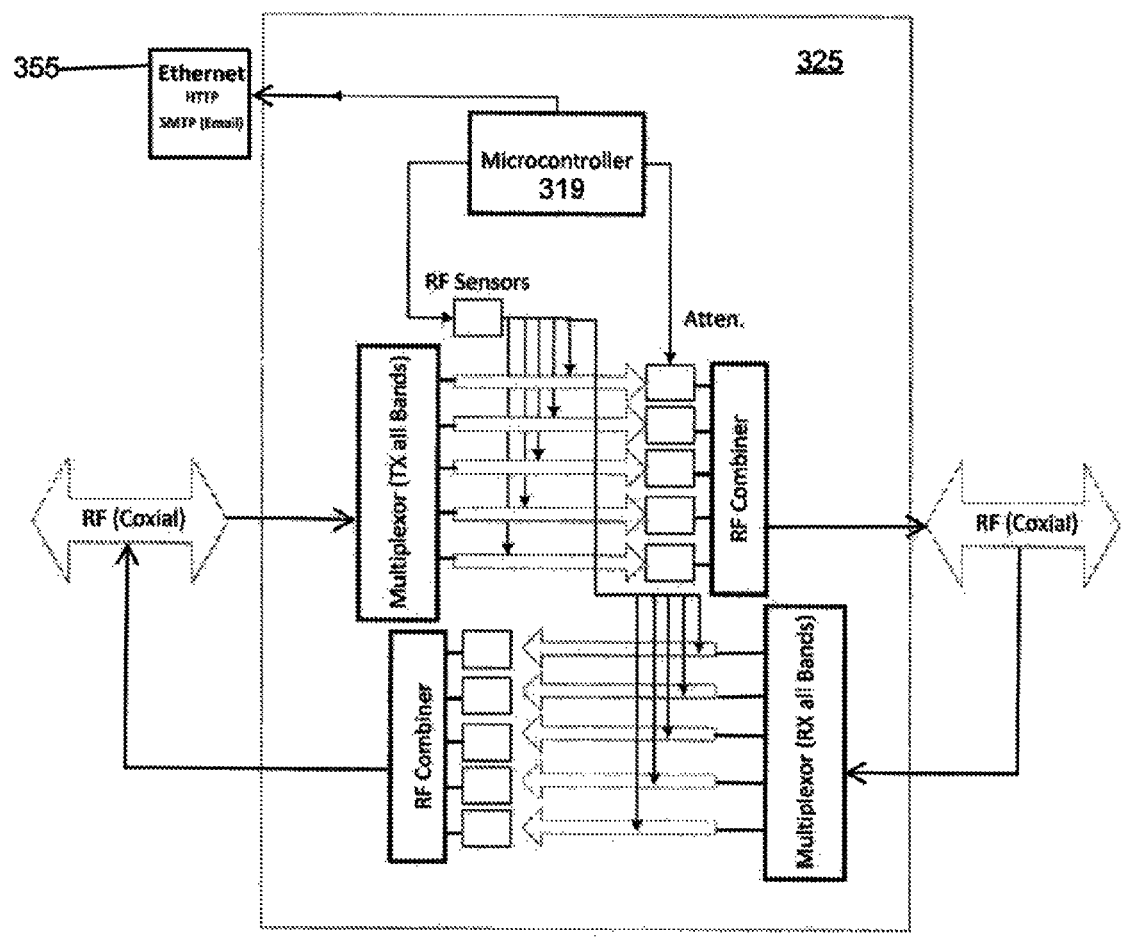
FIG. 2 is a schematic diagram of one embodiment of the system disclosed herein for monitoring a bi-directional amplifier positioned within an in-building wireless transmission system.

FIG. 2 emphasizes the control aspects of the system managed by a remotely operated computer receiving signal power information over an Ethernet connection and relaying power conversion data back to the distributed antenna system. In other words, a remote computer system communicates with at least one microcontroller positioned locally to the transmitted RF signals for managing power levels of RF signals by making adjustments to either the gain or the attenuation in the antenna system of FIG. 1.

Beginning with FIG. 1, a distributed antenna system includes a donor antenna (105) in wireless communication with a base station transmitter (100) and directing bi-directional RF signals (107) to and from components within the antenna system (i.e., ultimately between end user devices and the base station transmitter). As noted above, donor antennas (105) within the system transmit communications to and from service antennas (200) that are located closer to the end user devices (250) (i.e., service antennas may be located inside a building to provide high quality signals to end user devices also inside that building). In this scenario, the distributed antenna system disclosed herein incorporates a first arrangement (125) of signal conditioning hardware proximate a donor antenna (105) that serves as a transmitting and receiving apparatus between a base station (e.g., a cellular tower) (100) and a corresponding service antenna (200) in the network. Similarly, a second arrangement (225) of signal conditioning hardware is proximate the service antenna (200) to ensure optimal transmission of signals between the end user device (250), such as a cell phone or other mobile computer, and the antennas in the network. Generally, a donor antenna receives RF signals from a base station transmitter and processes these signals as the "downlink" signal (150A) for transmission to a service antenna in the network and then on to the end user device. In the return portion of a loop, the end user device transmits an "uplink" signal (150B) for transmission through the service antenna, to the donor antenna, and on to the base station transmitter.

In communications loops described above, signal degradation is a common issue to address. Standard coaxial cables present significant signal loss over long transmission spans between processing hardware connections. Accordingly, the distributed antenna system described herein combines optical fiber (150) with standard coaxial cable (107) already in existence between a donor antenna setup and a first stage (125) of downlink signal conditioning hardware. In particular, as illustrated in FIG. 1, a donor antenna (105) transmits the downlink signal (107, 150B) via RF coaxial cable to a first stage signal conditioning hardware assembly (125), which then transmits the appropriate RF downlink signal via optical fiber across a span to a second stage conditioning hardware assembly (225). The second stage hardware assembly (225) processes the downlink signal (50A) for optimal transmission by a service antenna (200) to an end user device (250). Both the first stage signal conditioning hardware assembly (125) and the second stage signal conditioning hardware assembly (225) incorporate the appropriate electronics to transmit uplink and downlink RF signals in a bi-directional manner, even across optical fibers, while ensuring that the noise levels, signal power, and overall quality of a data stream in the communications loop have been properly managed.

One feature of note in the first and second stage signal conditioning hardware apparatuses is the physical separation between hardware components (140, 240) completing amplification and gain control of the uplink and downlink signals (150) across the antenna system. In the signal conditioning system described herein, the downlink signal amplifier (140) is separated from and positioned in a location that is different from the uplink signal amplifier (240). One goal of this separation is to reduce thermal noise and channel cross talk that can be inherent in standard bi-directional amplifiers receiving and transmitting uplink and downlink RF signals via a single hardware component, such as a bi-directional amplifier. Also, cable loss is more readily overcome when the amplifier accounts for the transmission distance incorporated into the arriving signal quality. Instead of the standard solo bi-directional amplifier processing all of the uplink and downlink traffic from a single location, the amplifiers of one embodiment of a signal conditioning system disclosed herein are positioned proximate to respective donor and service antennas in locations that are typically separated by a significant distances. Of course, if bidirectional amplifiers are readily available in an installation, they will serve the same purpose.

In other words, the signal conditioning system disclosed herein includes first and second stage signal conditioning hardware apparatuses (125, 225) separated by physical distances comparable to the distance between the donor antenna (105) and service antennas (200). This physical separation of the signal conditioning hardware reduces thermal noise that is inherent in hardware components and also reduces the chance of uplink and downlink signals inserting unwanted crosstalk into the channels being served. The system further reduces noise by utilizing optical fiber instead of standard coaxial wire cables to span long distances.

In one embodiment, a signal conditioning system for a distributed antenna network includes a donor antenna (105) in a first location receiving a downlink radio frequency signal from a radio frequency source (100), such as, but not limited to, a base station transmitter (100) in a cellular system. The donor antenna (105) ultimately communicates the signal to a service antenna (200) in a second location different from the first location. The first location, proximate the donor antenna, includes a first stage signal conditioning apparatus (125) with the capability to handle uplink and downlink signals in appropriately respective manners to complete the communications loop between end user devices (250). The second location, proximate the service antenna, includes a second stage signal conditioning apparatus (225), which also has the capability to handle uplink and downlink signals in appropriately respective manners to complete a communications loop between end user devices and a broader network.

In considering the downlink signal first (i.e., the incoming signal (107) from the broader network, through a donor antenna (105), to a service antenna (200), and ultimately to an end user device (250)), the amplification and gain control (240) for the downlink signal (150A) is performed within the second stage signal conditioning hardware apparatus (225), located proximate the service antenna (200) and at the above-noted second location. This second stage signal conditioning hardware apparatus (225), therefore, includes a first amplifier (240) positioned proximately to said service antenna in said second position, and the first amplifier receives the downlink radio frequency signal from the donor antenna (105). The first amplifier (240), therefore, amplifies a power level of the downlink signal (150A) transmitted from the donor antenna (105). The first amplifier (240) then transmits an amplified downlink radio frequency signal (211) to the service antenna (200). The service antenna transmits the amplified downlink radio frequency signal to an end user device (250).

In a return communications step in an overall transmission loop, the end user device (250) transmits an uplink radio frequency signal back to the service antenna, which in turn establishes an appropriate link to transmit the uplink signal back to the donor antenna. A second amplifier (140) is positioned proximately to the donor antenna (105) in a first location apart from the first amplifier (240) in the second location of the service antenna (200). The second amplifier (140) receives the uplink radio frequency signal (150B) from the service antenna (200) to control the uplink gain on the signal returning from an end user device. Of course, as would be standard in fiber optic communication networks, both ends of the communication systems have the appropriate optical hardware (133, 233) for establishing proper optical data signals corresponding to RF communications.

By separating the gain control amplifiers (140, 240) for the uplink and downlink RF signals traversing the communications links, the signal conditioning system disclosed herein can reduce thermal noise incorporated into the system by the hardware components. Reducing thermal noise is a significant improvement in RF signal transmission that allows for the overall network to utilize optical fibers for transmitting signals over great distances. Given that thermal noise is a problem in optical data transmission, the separation of the hardware allows for greater transmission integrity over fiber optic cables. Separating the signal gain amplifiers also allows the system to overcome cable losses, whether coaxial or fiber losses, by the arriving signal being assessed with transmission losses incorporated as it arrives at the amplifiers. The signal conditioning system described herein utilizes both standard coaxial wire cables and optical fibers. In particular, the system may take advantage of currently installed coax cable between a donor antenna and an existing building or campus but install fiber optics between the first stage signal conditioning hardware apparatus near the donor antenna and the second stage signal conditioning apparatus near the service antenna. Standard coax cable may also be available for use already to transmit signals between the second stage signal conditioning apparatus and the service antenna. In other words, the system disclosed herein is amenable for using diverse transmission media to serve the situation at hand. In particular, separating the gain control amplifiers for the uplink and downlink signals reduces thermal noise from hardware system components that could degrade an optical signal transmitted via optical fibers and improves the signal quality of the signals transmitted by diverse transmission media.

FIG. 1 illustrates numerous components of the overall communications loop described herein allowing for bi-directional communications among base station transmitters, donor antennas, service antennas, and end user devices communicating with one another as described above. Overall, standard telecommunications hardware establishes communications between the base station transmitter (100), such as a cellular signal tower, and a donor antenna (105) transmitting numerous carriers' data signals to end user devices (250) within a defined geographical region, such as a building or a campus of buildings. As illustrated in the non-limiting embodiment of FIG. 1, a first stage signal conditioning hardware apparatus (125) receives carrier data via coaxial cable (107) (or in different embodiments, optical fibers) and receives all bands of communications via a multiplexor (110). The multiplexor separates the incoming data into proper channels (111) for transmission to the appropriate end user device, such as a cell phone or other mobile computer or processor. The first stage signal conditioning hardware apparatus (125) includes components, such as a designated radio frequency power sensor (115) for each channel of data, and the power sensor hardware is in electronic communication with a micro controller (119) that monitors and operates an attenuator (127) that receives the channelized data communications. The attenuator receives instructions from the microcontroller, processing power data from the RF sensor, to lower the power level of certain channels of data. The attenuator, therefore, adjusts the power level of a downlink signal that is "coming in too hot" or at too high of a power because a single channel of data with excess power can cause that high power signal to add noise to other channels and cause an imbalance in the overall network. Upon ensuring that the power level is appropriate, an RF combiner re-assembles the carriers' diverse data in each channel, and fiber optic conversion equipment prepares each RF signal for transmission over optical fibers to a second stage signal conditioning apparatus at a different location. In one non-limiting embodiment, the different location is proximate the service antenna that will receive the particular data channel.

A second stage signal conditioning hardware apparatus (225) includes the necessary RF over fiber conversion equipment (233A, 233B) to prepare a series of incoming channels of RF signals for data management and conditioning. At this second stage (225), a first amplifier (240) provides gain control to account for anomalies in the downlink signal strength across all channels and even account for periods when a certain channel goes silent so that the gain control does not exacerbate other channels' power levels because one channel in not currently transmitting active data. The gain control hardware, which may be any one of a number of amplifiers or even bi-directional amplifiers, is in electronic communication with a second multiplexor proximate the service antenna site, which coordinates downlink data traffic to at least one service antenna in a geographic region transmitting data to appropriate end user devices.

The end user devices, in turn, create and transmit uplink data (150B) for return transmission via the service antenna. The service antenna may use existing coaxial cables to transmit these return RF signals to the second multiplexor within the second stage signal conditioning hardware apparatus, establishing an electronic communications link between the service antennas and the second conditioning hardware (225) proximate the service antenna (200). Similar to the hardware discussed above for the first stage signal conditioning hardware apparatus, the second stage hardware, proximate the service antennas, includes a second set of RF sensors (215) monitoring the respective uplink signal power levels, a second microcontroller (210) processing the uplink power data, and a second attenuator (227) in electronic communication with the second microcontroller (210) such that the microcontroller adjusts power attenuation of each uplink channel. Again, optical data conversion equipment prepares the channelized data for transmission across an uplink fiber network and sends the uplink RF signal over optical fiber back to the first stage signal conditioning hardware apparatus.

The first stage signal conditioning hardware apparatus incorporates a second gain control hardware (140), such as one of many kinds of amplifiers or bi-directional amplifiers available today. As noted above, the second amplifier (140) is located proximate the donor antenna (105) at a location that is distinct from the location of the first, or downlink, amplifier (240). This separation can reduce thermal noise for better reception of optical data leading to a higher quality uplink signal. The uplink signal is passed to the multiplexor for ultimate transmission to a donor antenna by either standard coaxial cables or potentially even additional fiber optics. Finally, the donor antenna communicates all of the carriers' data back to the original RF source, such as a base station in a cellular network.

FIG. 2 illustrates that the overall process of power management regarding channelized uplink and downlink data may be controlled by appropriate first and second microcontrollers within each stage of signal conditioning. The microcontrollers may communicate with remotely controlled computers, outside of the communications loops described herein, so that the power levels and associated attenuation processes managing those power levels may be remotely controlled. In the non-limiting embodiment disclosed herein, the microcontrollers communicate with remote data processing equipment via an Ethernet connection; however, numerous kinds of technology would allow for the same remote monitoring.

The invention claimed is:

1. A signal conditioning system for a distributed antenna network, the system comprising:
    a donor antenna in a first location receiving a downlink radio frequency signal from a radio frequency source;
    a service antenna in a second location different from said first location;
    a first amplifier positioned proximately to said service antenna in said second location, said first amplifier receiving said downlink radio frequency signal from said donor antenna, amplifying a power level of said downlink signal transmitted from said donor antenna, and transmitting an amplified downlink radio frequency signal to said service antenna,
    wherein said service antenna transmits said amplified downlink radio frequency signal to an end user device, said end user device transmitting an uplink radio frequency signal back to said service antenna;
    a second amplifier positioned proximately to said donor antenna in said first location apart from said first amplifier in said second location, said second amplifier receiving said uplink radio frequency signal from said service antenna;
    a first multiplexor establishing an electronic communications link between said donor antenna and said first amplifier;
    a second multiplexor establishing an electronic communications link between said service antenna and said second amplifier; and
    optical fiber between said service antenna and said second amplifier, said optical fiber transmitting said uplink radio frequency signal from said user device to said second amplifier, and coaxial cable between said second amplifier and said donor antenna, said coaxial cable transmitting an amplified uplink signal to said donor antenna.

2. A signal conditioning system according to claim 1, further comprising optical fiber sending said downlink radio frequency signal to said first amplifier and coaxial cable sending said amplified downlink signal to said service antenna.

3. A signal conditioning system according to claim 1 further comprising:
    a first radio frequency power sensor in communication with said downlink radio frequency signal confirming a downlink signal power level of said downlink radio frequency signal;
    a first controller in electronic communication with said first radio frequency power sensor;
    a first attenuator in electronic communication with said first controller and adjusting said downlink signal power level to a desired downlink power level.

4. A signal conditioning system according to claim 1 further comprising:
    a second radio frequency power sensor in communication with said uplink radio frequency signal confirming an uplink signal power level of said uplink radio frequency signal;
    a second controller in electronic communication with said second radio frequency power sensor; and
    a second attenuator in electronic communication with said second controller and adjusting said uplink power level to a desired uplink power level.

5. A signal conditioning system for a distributed antenna network, the system comprising:
    a donor antenna in a first location receiving a downlink radio frequency signal from a radio frequency source;
    a service antenna in a second location different from said first location, wherein said service antenna transmits said downlink radio frequency signal to an end user device, said end user device transmitting an uplink radio frequency signal back to said service antenna;
    wherein said donor antenna receives said uplink radio frequency signal from said service antenna;
    a first radio frequency power sensor in communication with said downlink radio frequency signal confirming a downlink signal power level of said downlink radio frequency signal;
    a first controller in electronic communication with said first radio frequency power sensor;
    a second radio frequency power sensor in communication with said uplink radio frequency signal confirming an uplink signal power level of said uplink radio frequency signal;
    a second controller in electronic communication with said second radio frequency power sensor;
    wherein said first and second controllers transmit power level data to a remote computer processing said power level data.

6. A signal conditioning system according to claim 5, further comprising a first attenuator in electronic communication with said first controller and adjusting said downlink signal power level to a desired downlink power level, wherein said first controller receives downlink power adjustment data from said remote computer to control said first attenuator.

7. A signal conditioning system according to claim 5, further comprising a second attenuator in electronic communication with said second controller and adjusting said uplink signal power level to a desired uplink power level, wherein said second controller receives downlink power adjustment data from said remote computer to control said second attenuator.

8. A signal conditioning system according to claim 5, further comprising a first amplifier receiving said downlink signal via optical fiber and sending an amplified downlink radio frequency signal to said service antenna via coaxial cable.

9. A signal conditioning system according to claim 8, further comprising a first multiplexor establishing an electronic communications link between said donor antenna and said first amplifier.

10. A signal conditioning system according to claim 5, further comprising a second amplifier receiving said uplink radio frequency signal via optical fiber and sending an amplified uplink radio frequency signal to said donor antenna via coaxial cable.

11. A signal conditioning system according to claim 10, further comprising a second multiplexor establishing an electronic communications link between said service antenna and said second amplifier.

* * * * *